Figure 1:
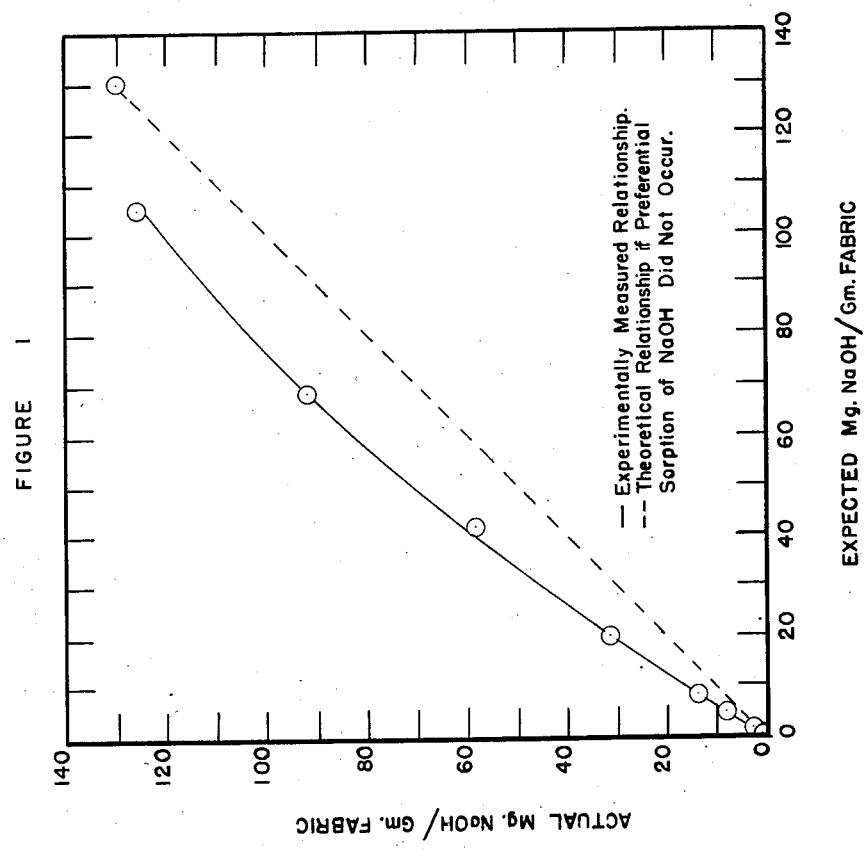

March 26, 1957 J. COMPTON ET AL 2,786,258
CYANOETHYLATED NATIVE COTTON FIBERS
AND PROCESS OF MAKING THE SAME
Filed July 12, 1954 10 Sheets-Sheet 8

INVENTOR
JACK COMPTON
CATESBY P. JONES

ATTORNEY

INVENTOR
JACK COMPTON
CATESBY P. JONES

United States Patent Office 2,786,258
Patented Mar. 26, 1957

2,786,258

CYANOETHYLATED NATIVE COTTON FIBERS AND PROCESS OF MAKING THE SAME

Jack Compton, Charlottesville, Va., and Catesby P. Jones, Bethesda, Md., assignors to Institute of Textile Technology, Charlottesville, Va., a corporation of Virginia Application July 12, 1954, Serial No. 442,762

6 Claims. (Cl. 28—82)

This invention relates to the reaction of acrylonitrile with cotton and has for its object the provision of improved cotton products and a process of reacting acrylonitrile with cotton fibers in the form of bulk fibers, yarns, or fabrics to improve the properties of the cotton while maintaining the natural structure of the fiber and most of the properties of ordinary cotton. Our invention provides an economical and practical process of producing our improved cotton products with a minimum loss of chemicals through washing, neutralizing and undesirable by-product formation. The improved cotton products of our invention are a partially cyanoethylated cotton, but they have the important distinction of retaining the natural fibrous form of native cotton fibers, and their crystallinity in a substantially unaltered state.

Several processes have been proposed heretofore for treating cellulose with aqueous solutions of sodium hydroxide and acrylonitrile to effect from a partial to a complete cyanoethylation, usually resulting in a soluble product, but, in any event, resulting in a product having a materially changed physical structure. Notwithstanding a considerable number of patents and other publications concerning the cyanoethylation of cotton and regenerated cellulose, namely rayon, there has not been any commercially successful process developed heretofore.

Our invention is based on several important discoveries we have made in an extensive investigation of the cyanoethylation of cotton through which we may control the conditions for reacting acrylonitrile, $CH_2=CH_2—CN$, with but a relatively small proportion of the cellulose giving cyanoethylcellulose which may be represented as Cell—O—$CH_2$—$CH_2$—CN. We have found that very desirable cotton products can be formed by effecting but a partial etherification of the cellulose molecule, resulting in but from 0.06 to 1.0 cyanoethyl group per anhydroglucose unit (equivalent to from 0.50 to 6.50% nitrogen based on the weight of cyanoethylated cotton). In the preferred and most advantageous embodiment of our invention, we control the conditions to combine but from 0.1 to 0.6 cyanoethyl groups per anhydro-glucose unit.

The following table shows the relationship between the cyanoethyl groups per anhydro-glucose unit and the nitrogen content of the cyanoethylated cotton:

TABLE A

| Percent N | Cyanoethyl Groups per Anhydro Glucose Unit |
|---|---|
| 0.50 | 0.060 |
| 0.62 | 0.074 |
| 0.77 | 0.092 |
| 1.20 | 0.146 |
| 1.64 | 0.220 |
| 1.77 | 0.202 |
| 1.89 | 0.236 |
| 2.40 | 0.306 |
| 3.08 | 0.417 |
| 3.16 | 0.405 |
| 3.80 | 0.515 |
| 4.30 | 0.595 |
| 4.85 | 0.691 |
| 5.24 | 0.760 |
| 6.52 | 1.020 |
| 9.80 | 1.820 |
| 13.00 | 3.000 |

Our invention is specifically directed to the treatment of native cotton because we aim to produce an improved cotton fiber and cotton is peculiarly suited to our process. While cotton is a relatively pure form of cellulose, the fibers are considered to be formed of three distinct types of layers each having a different physical structure, consisting of amorphous and crystalline components. Mild reaction conditions, such as the preferred cyanoethylation procedure herein described, are required to maintain this desirable fiber structure. In particular the relationship between the amorphous and crystalline components should be maintained. One further characteristic of cotton is that the degree of polymerization varies from about 1500 to 4500 and in this respect it differs from viscose rayon which has a degree of polymerization of from about 150 to 450. In general, all regenerated cellulosic fiber materials have a greater proportion of the amorphous component than native cotton and the crystalline component is characterized by having the mercerized cellulose molecular arrangement. Cotton thus has a different structural arrangement and responds differently than regenerated cellulose when treated with such chemicals as sodium hydroxide and acrylonitrile. Because of its structure, cotton is a very important textile material and our process maintains its structural identity.

We have discovered a very important relationship involving the concentration of sodium hydroxide in the steeping solution for treating the cotton prior to cyanoethylation, the amount of sodium hydroxide fixed to or combined with the cellulose, and the time and temperature of the reaction of acrylonitrile with the steeped cotton to effect the amount of cyanoethylation necessary to produce the improved cotton products. We can carry out our process in producing our improved cotton products without excessive loss in sodium hydroxide and in by-product formation which results in a loss of acrylonitrile. Our invention can be carried out with a relatively small amount of sodium hydroxide, and this is important since this chemical is lost in the neutralizing and washing operations necessary in the process. Not only is the saving in sodium hydroxide an appreciable item but the saving in the neutralizing acid required in the process is also an important item.

In addition to an important saving in chemicals, the fibers of cotton are reacted under controlled conditions of time and temperature to effect the desired reaction to fix a definite amount of acrylonitrile on the cotton and thus maintain its natural fibrous character and internal molecular arrangement with an improvement in its utility as a cotton-like fiber.

The manner in which we treat the cotton with sodium hydroxide is a very important part of our invention because the cyanoethylation cannot give satisfactory results unless there has been a relatively uniform application of sodium hydroxide to all the fibers thereby leaving on the fibers, whether combined or sorbed, a predetermined amount of sodium hydroxide, and to this end we prefer to use a dilute solution of sodium hydroxide, in no event more concentrated than 10%, preferably below 2% and most advantageously in the range of 0.10% to 1.75%. Objectively, the sodium hydroxide solution should be used to cause the cotton to acquire the minimum amount of sodium hydroxide required to effect the reaction to the desired extent with a saving of chemicals. This is most advantageous in the range of 1.5 to 22 milligrams of sodium hydroxide per gram of cotton.

In carrying out our invention, precautions must be taken to direct the addition of the cyanoethyl groups —$CH_2$—$CH_2$—CN without or with no appreciable hydrolysis to form carboxyethyl groups

—$CH_2$—$CH_2$—COOH

It is accordingly necessary to avoid the use of strong caustic solutions (say over 10% NaOH) since the presence of such solutions tends to hydrolyze the nitrile —CN to carboxyl —COOH and significantly increases the proportion of the amorphous fiber component. It is particularly advantageous, therefore, to avoid the use of concentrations of sodium hydroxide which cause these changes in the cyanoethylated product and its precursor.

We have found that in order to preserve the fibrous character of the cotton and form only a small portion of cyanoethylcellulose that uniformity of sodium hydroxide treatment is necessary and we can best achieve the desired uniformity by treating the cotton with a large volume of dilute solution rather than with a small volume of strong solution objectively to treat all fibers alike. It is definitely advantageous to use a dilute solution of sodium hydroxide and to sorb on the cotton from 1.5 to 22 milligrams of sodium hydroxide per gram of cotton.

Our invention provides improved cotton products derived from native cotton characterized by having the amorphous portion of the fibers combined with acrylonitrile in the from of cyanoethylcellulose while substantially all of the crystalline structure of the cotton fiber is retained. The amorphous portion has such an amount of combined acrylonitrile that the nitrogen content of the entire fiber varies from 0.77 to 6.5%.

The partially cyanoethylated cotton fibers of our invention are similar in appearance, hand, and processing characteristics to cotton, but differ primarily and significantly in that they are permanently resistant to microorganism attack, such as cause mildew; more resistant to wet and dry heat degradation; more receptive to many dyes of all classes, including acid dyes; and more resistant to abrasion.

One of the features found in our investigations is that the amount of sodium hydroxide sorbed takes place in a very few minutes and that longer contact does not add appreciable amounts. Based on the amount of available sodium hydroxide in the solution, the actual sorption is a function of the sodium hydroxide in the liquor and there is about as much sodium hydroxide sorbed in fifteen minutes as in thirty minutes.

The cotton impregnated with sodium hydroxide solution in a presteeping treatment is treated to remove substantially all of the adhering solution as by centrifuging, for example, until the weight of the presteeped cotton is about double the weight of the untreated cotton. Acrylonitrile usually containing some water is then applied to the cotton, preferably at a temperature around the boiling point of the solution which is from 71° to 76° C. under atmospheric pressure depending on the amount of water present. The rate and extent of cyanoethylation increase with the amount of sodium hydroxide sorbed on the cotton. The rate and extent of cyanoethylation also increase with an increase in temperature, other factors being equal. In producing our products the temperature of acrylonitrile and the time of treatment must be observed in relation to the sodium hydroxide content of the cotton to acquire the desired cyanoethylation. Our invention provides a process for controlling cyanoethylation to prevent an undue substitution of cyanoethyl groups with a material saving in chemicals, in a relatively short time, to selectively cyanoethylate the amorphous portion of the fibers, resulting in superior cotton-like fiber products.

In achieving the important resistance to degradation by mildew-causing organisms we do not appreciably change the physical properties of the fibers, and unlike the proposed practices published heretofore we avoid deterioration in strength resulting from the higher degrees of substitution and also impart heat resistance to the cotton. Moreover, we obtain products having superior resistance to mildew.

The process of our invention will be described, by way of example, with reference to the treatment of 80 x 80 kiered and bleached cotton print cloth. Kiered cloth is cloth treated with a dilute sodium hydroxide solution so as to remove fats, waxes, proteinaceous material and mineral salts, neutralized with acid solution, and then bleached in a solution of hydrogen peroxide or sodium hypochlorite. Any suitable equipment of the type commonly used to wash, dye or bleach cotton yarns or fabrics may be used.

The operations carried out as an illustration of our process and in which the data hereinafter described was obtained were as follows:

A four-yard piece of 80 x 80 kiered and bleached print cloth 31 inches wide was folded along the warp direction into a strip approximately six inches wide. This folded strip was wound onto a 1⅝" dyeing spring and secured by wrapping the outside with string. A 1⅝" dye tube was inserted into the spring to support the package during centrifuging and the fabric package was placed in the one-pound Gaston County Package Dyeing Machine.

After the machine had been closed and the valves adjusted for the dyeing cycle, 5500 ml. of sodium hydroxide of the desired concentration was introduced through the expansion tank. When treating finished goods such as those described, it is advantageous to include in the caustic a suitable wetting agent, such as tergitol P-28 (sodium di(2-ethylhexyl) phosphate) or Aerosol-OS (isopropyl naphthalene sodium sulfonate). This caustic, containing 0.1% of Tergitol P-28, was circulated through the fabric for fifteen minutes, reversing the flow of the liquid every two minutes. Then the sodium hydroxide solution was drained, and the package removed from the dyeing machine. The D. P. values referred to herein were determined by using the equation of Kraemer (Industrial and Engineering Chemistry, 30, 1200 (1938). It was placed in the centrifuge specifically designed for a single dye package and centrifuged for two minutes to give a caustic pickup of 70–100%.

The fabric package was then returned to the dyeing machine and after the machine was again adjusted for the dyeing cycle, 5500 ml. of acrylonitrile was introduced through the expansion tank. The expansion tank was shut off from the circulating system and the temperature of the acrylonitrile was adjusted to the desired point by introducing steam or cold water into the dye pot jacket. The acrylonitrile was pumped through the fabric for the desired time period, reversing the direction of flow every two minutes.

After the reaction time had elapsed, the acrylonitrile was allowed to circulate through the expansion tank and sufficient acetic acid was introduced to neutralize the sodium hydroxide. Simultaneously, cold water was circulated through the dye pot jacket to reduce the temperature. The acrylonitrile was then drained into a recovery vessel and the fabric was thoroughly washed by circulating water through the package dye machine. The fabric was then removed from the machine, unrolled from the dyeing spring, and washed in an automatic household washer, following the regular automatic cycle of washing and rinsing of the machine, but without using a detergent. The fabric was then air dried and stored for testing.

The following data and calculations were made for each experiment:

1. The dry weight of the fabric before treatment;
2. The amount of sodium hydroxide solution in the cloth after pretreatment;
3. The milligrams of expected and actual sodium hydroxide per gram of dry fabric after pretreatment;
4. The change in sodium hydroxide concentration as a result of the fabric presteeping treatment;

5. The dry weight of the fabric after cyanoethylation;
6. The amount of acrylonitrile recoverable after cyanoethylation;
7. The extent of cyanoethylation based upon the weight pickup during reaction;
8. The extent of cyanoethylation based upon nitrogen fixed to the fabric, as determined by Kjeldahl digestion.

The concentration of sodium hydroxide in the liquor removed by centrifuging the package was also determined periodically during centrifuging for some reactions.

These data and calculations are summarized in Tables I, II, III, IV, V and VI.

*Table I.—The effect of concentration on the sodium hydroxide content of the centrifuged fabric*

[The fabric was treated for 15 minutes and centrifuged for 2 minutes.]

| Original Caustic Conc., percent | Caustic Conc. after Treatment, percent | Conc. of Centrif. Liquor, percent | Fabric Wt. Increase, percent | Actual, mg. Caustic/gm. Fabric | Expected, mg. Caustic/gm. Fabric | Actual/Expected Ratio |
|---|---|---|---|---|---|---|
| 0.11 | 0.1 | 0.117 | 70 | 1.46 | 0.70 | 2.1 |
| 0.253 | 0.233 | 0.232 | 72 | 2.93 | 1.68 | 1.7 |
| 0.76 | 0.69 | 0.67 | 70.9 | 8.8 | 4.9 | 1.8 |
| 1.23 | 1.17 | 1.15 | 72 | 14.3 | 8.45 | 1.7 |
| 1.73 | 1.53 | 1.55 | 70 | 18.5 | 10.7 | 1.7 |
| 3.00 | 2.77 | 2.76 | 71 | 31.9 | 20.0 | 1.6 |
| 5.7 | 5.4 | 5.4 | 78 | 58.8 | 42.0 | 1.4 |
| 8.3 | 8.0 | 7.9 | 86 | 92.0 | 69.0 | 1.3 |
| 11.3 | 10.7 | 10.8 | 98 | 126.0 | 105.0 | 1.2 |

*Table II.—The effect of reaction conditions upon fabric cyanoethylation at 46° C.*

| Reaction Time, hrs. | Percent NaOH Solution Before Treatment | Percent NaOH Solution After Treatment | Fabric Wt. Increase, Percent | mg. NaOH/gm. Fabric Actual | mg. NaOH/gm. Fabric Theo. | Percent N (Anal.) | Percent AN Distillable | AN Used/ AN Fixed |
|---|---|---|---|---|---|---|---|---|
| ½ | 0.25 | | | | | | | |
| 1 | 0.24 | 0.23 | 77 | 3.1 | 1.8 | 0.82 | 96 | 17.6 |
| 2 | 0.24 | 0.22 | 79 | 2.7 | 1.7 | 1.5 | 97 | 6.8 |
| 4 | 0.24 | 0.21 | 78 | 2.5 | 1.6 | 1.4 | 92 | 19.0 |
| ½ | 0.75 | | 70 | | | 1.35 | 93 | 18.0 |
| 1 | 0.75 | 0.68 | 62 | 4.7 | 4.2 | 1.6 | 95 | 10.0 |
| 2 | 0.75 | 0.68 | 63 | 7.8 | 4.3 | 1.8 | 90 | 19.0 |
| 4 | 0.75 | 0.68 | 62 | 4.9 | 4.2 | 1.95 | | |
| ½ | 1.25 | | | | | | | |
| 1 | 1.25 | 1.15 | 61 | 14.7 | 7.0 | 2.0 | 93 | 11.0 |
| 2 | 1.25 | 1.15 | | | | 2.3 | 86 | 20.0 |
| 4 | 1.25 | 1.15 | 66 | 14.8 | 7.6 | 2.3 | 79 | 29.0 |
| ½ | 1.75 | | | | | | | |
| 1 | 1.75 | | 65 | | | 2.2 | 91 | 13.0 |
| 2 | 1.75 | | 64 | | | 2.4 | 89 | 15.0 |
| 4 | 1.75 | | 69 | | | 2.5 | 77 | 29.0 |

AN represents acrylonitrile.
AN Used is the amount of acrylonitrile not recoverable.

*Table III.—The effect of reaction conditions upon fabric cyanoethylation at 62° C.*

| Reaction Time, hrs. | Percent NaOH Solution Before Treatment | Percent NaOH Solution After Treatment | Fabric Wt. Increase, Percent | mg. NaOH/gm. Fabric Actual | mg. NaOH/gm. Fabric Theo. | Percent N (Anal.) | Percent AN Distillable | AN Used/ AN Fixed |
|---|---|---|---|---|---|---|---|---|
| ¼ | 0.25 | | 72 | | | 1.2 | 96 | 12.0 |
| ½ | 0.25 | | 73 | | | 1.4 | 95 | 12.0 |
| 1 | 0.25 | 0.23 | 77 | 3.1 | 1.8 | 1.7 | 94 | 12.0 |
| 2 | 0.25 | 0.23 | 73 | 3.1 | 1.7 | 1.85 | 89 | 21.0 |
| 4 | 0.25 | 0.23 | 75 | 3.1 | 1.7 | 2.0 | 85 | 25.0 |
| ½ | 0.75 | | 71 | | | 2.0 | 91 | 15.0 |
| 1 | 0.73 | 0.67 | 59 | 8.2 | 3.9 | 2.4 | 86 | 21.0 |
| 2 | 0.73 | 0.69 | 60 | 7.9 | 4.2 | 2.7 | 76 | 29.0 |
| 4 | 0.73 | 0.68 | | | | 3.0 | 58 | 45.0 |
| ½ | 1.25 | | 72 | | | 2.5 | 85 | 20.0 |
| 1 | 1.30 | 1.20 | 65 | 13.4 | 7.8 | 2.7 | 79 | 25.0 |
| 2 | 1.30 | 1.20 | 65 | 13.6 | 7.8 | 3.2 | 64 | 36.0 |
| 4 | 1.30 | 1.20 | 64 | 14.8 | 7.7 | 3.6 | 42 | 50.0 |
| ½ | 1.75 | | | | | | | |
| 1 | 1.70 | 1.60 | 66 | 19.8 | 10.6 | 3.1 | 73 | 28.0 |
| 2 | 1.70 | 1.60 | 65 | 19.7 | 10.4 | 4.9 | 57 | 26.0 |
| 4 | 1.70 | 1.60 | 66 | 19.5 | 10.6 | 4.9 | 40 | 35.0 |
| ½ | 1.95 | | 72 | | | 2.8 | 82 | |
| 1 | 1.95 | | 89 | | | 3.3 | 70 | 30.0 |
| 1 | 2.0 | | 74 | | | 3.5 | 70 | 25.0 |
| 1 | 2.0 | | 72 | | | 3.4 | 75 | 23.0 |
| 1 | 2.0 | | 74 | | | 3.6 | 75 | 21.0 |

AN represents acrylonitrile.
AN Used is the amount of acrylonitrile not recoverable.

Table IV.—The effect of reaction conditions upon fabric cyanoethylation at 75° C., 80° C., and 85° C.

| Reaction Time, hrs. | Percent NaOH Solution Before Treatment | Fabric Wt. Increase, Percent | Percent N (Anal.) | Percent N (Wt. Pick-up) | Percent AN Distillable | AN Used/ AN Fixed |
|---|---|---|---|---|---|---|
| 1 | 0.1 | 75 | 1.6 | 1.5 | 96 | 8.8 |
| ⅙ | 0.25 | | 2.1 | 1.9 | 97 | 4.8 |
| ¼ | 0.25 | 71 | 2.1 | 0.85 | 85 | 25.0 |
| ½ | 0.25 | | 2.0 | | | |
| 1 | 0.25 | 72 | 2.5 | 2.0 | 88 | 16.0 |
| 2 | 0.25 | | 3.0 | | | |
| ½ | 0.75 | 73 | 3.4 | 3.55 | 78 | 20.0 |
| 1 | 0.75 | 76 | 4.9 | 4.9 | 58 | 24.0 |
| 2 | 0.75 | 73 | 5.4 | 5.5 | 23 | 40.5 |
| ½ | 1.25 | | 5.9 | | | |
| 1 | 1.25 | | 6.9 | | | |
| ½ | 1.75 | | 7.1 | | | |
| 1 | 1.75 | | | | | |
| 1 | 1.95 | 60 | 4.8 | 4.5 | 38 | |
| 1 | 0.75 | 72 | 6.2 | 8.2 | 47 | 20.0 |
| 1 | 0.75 | 72 | 6.6 | 6.8 | | |
| 1 | 0.1 | 70 | 2.0 | 1.8 | 94 | 9.0 |
| ½ | 0.25 | | 3.5 | | | |
| 1 | 0.25 | 68 | 4.2 | 4.3 | 73 | 18.0 |
| ¼ | 0.75 | 71 | 4.4 | 4.4 | 68 | 21.0 |
| ½ | 0.75 | 74 | 6.3 | 6.2 | 50 | 21.0 |
| 1 | 0.65 | 71 | 6.7 | 6.8 | | |
| ½ | 1.25 | | 5.9 | | | |
| ½ | 1.75 | | | | | |

AN represents acrylonitrile.
AN Used is the amount of acrylonitrile not recoverable.

Table V.—The relationship between reaction conditions and fabric properties

| Reaction Conditions | | | Percent Strength Loss in Heating | Stoll Abrasion Resistance | | | Percent Strength Loss in Soil Burial [1] |
|---|---|---|---|---|---|---|---|
| Time Hrs. | Percent NaOH | Percent N | | Percent Decrease Warp Flex | Percent Decrease Filling Flex | Percent Increase Flat | |
| 1 | 0.25 | 0.8 | 68 | 26 | 40 | 27 | 100 |
| 1 | 0.75 | 1.2 | 78 | 43 | 52 | 18 | 66 |
| 1 | 0.25 | 1.5 | 70 | 45 | 65 | 36 | 37 |
| 1 | 0.25 | 1.9 | 60 | 46 | 52 | 35 | 24 |
| 1 | 0.10 | 2.0 | 31 | 29 | 40 | 44 | 41 |
| 1 | 1.25 | 2.0 | 60 | 48 | 55 | 53 | 11 |
| 1 | 1.75 | 2.2 | 40 | 40 | 48 | 53 | 21 |
| 1 | 0.25 | 2.5 | 45 | 47 | 50 | 28 | 2 |
| 4 | 1.75 | 2.5 | 62 | 52 | 54 | 32 | 0 |
| 1 | 1.95 | 3.3 | 15 | | | | |
| 2 | 1.75 | 3.8 | 53 | 36 | 54 | 76 | 6 |
| 1 | 0.25 | 4.1 | 24 | 31 | 26 | 98 | 0 |
| ¼ | 0.75 | 4.5 | 19 | | | | |
| 1 | 0.75 | 4.9 | 10 | 23 | 41 | 173 | |
| 4 | 1.75 | 4.9 | 46 | | | | |
| 2 | 0.75 | 5.5 | 28 | | | | |
| 1 | 0.65 | 6.7 | 56 | 11 | 16 | 179 | 5 |
| Control Fabric | | | 80 | | | | 100 |

[1] Two weeks soil burial 28° C.; pH 7.0; moisture content of soil 25%.

Table VI.—Comparison of dyeing properties of cotton and partially cyanoethylated cotton (80 x 80) print cloth using various types of dyes in concentrations required to obtain same shade. The cyanoethylated cotton fabric used in this test contained 1.5% nitrogen

[Ratio of dye liquor to fabric in all cases was 50:1. The concentration is based on the weight of dyestuff to weight of goods.]

| Type of Dye | Name | Percent Decrease in Dye used for Cyano-ethylated Cotton Fabric | Light Fastness [1] | Wash Fastness | Wet and Dry Crocking |
|---|---|---|---|---|---|
| Sulphur | Sulfogen Golden Brown RCF | 33 | − | (2) | (2) |
| Vat | Ponsol Blue GDD | 40 | + | (2) | (2) |
| Direct | Pontamine Fast Green 5 BL | 40 | − | (2) | (2) |
| Direct (Copper Aftertreat) | Coprantine Blue BLL | 40 | + | (2) | (2) |
| Naphthol | ASSW with Red Salt B | 33 | + | (2) | (2) |
| Developed | Rosanthrene Red 9BL Developed with B-Naphthol. | 40 | − | (2) | (2) |
| Basic | Victoria Blue B without mordant | 60 | + | (2) | (2) |
| Acid | Cloth Fast Brilliant Red 38W | | + | (2) | (2) |

[1] + means cyanoethylated cotton was equal to or better than cotton fabric in Fade-Ometer test. − means cyanoethylated cotton was not as good as cotton fabric in Fade-Ometer.
[2] Cyanoethylated cotton and cotton equal.

Cotton yarns may be similarly cyanoethylated and in practice this is the preferred form for the equipment employed, although it may also be used on bulk fibers with the proper machine adapter.

Figure 9:
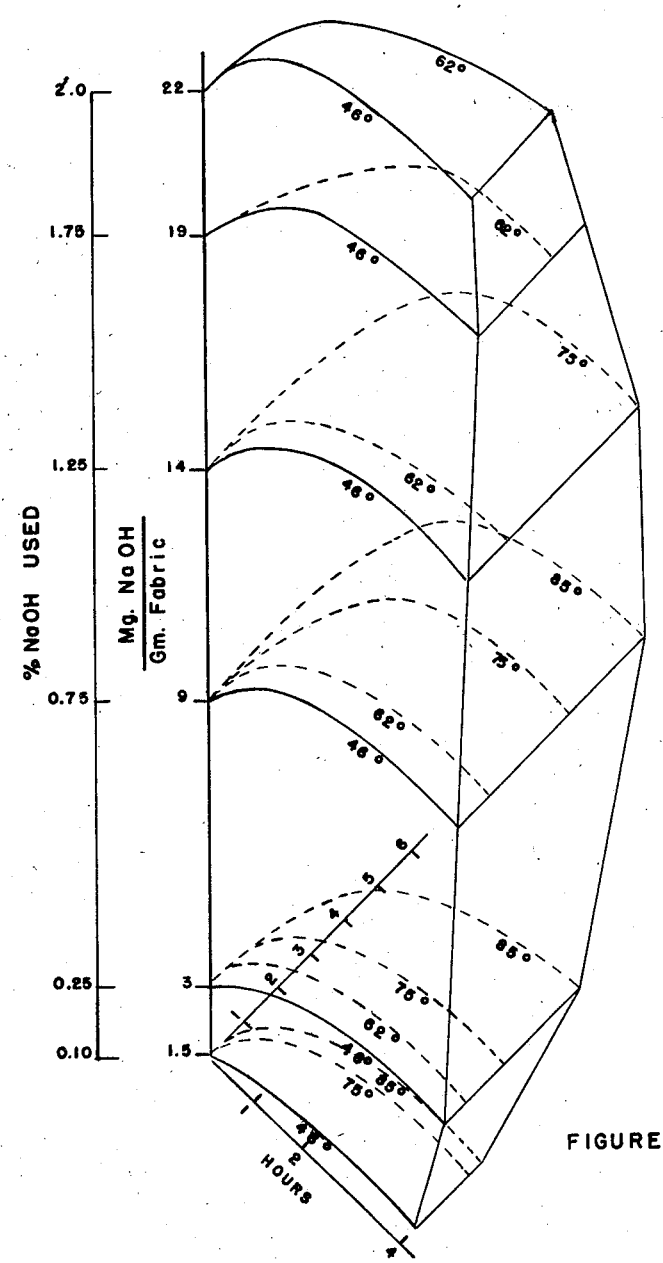
Figure 10:
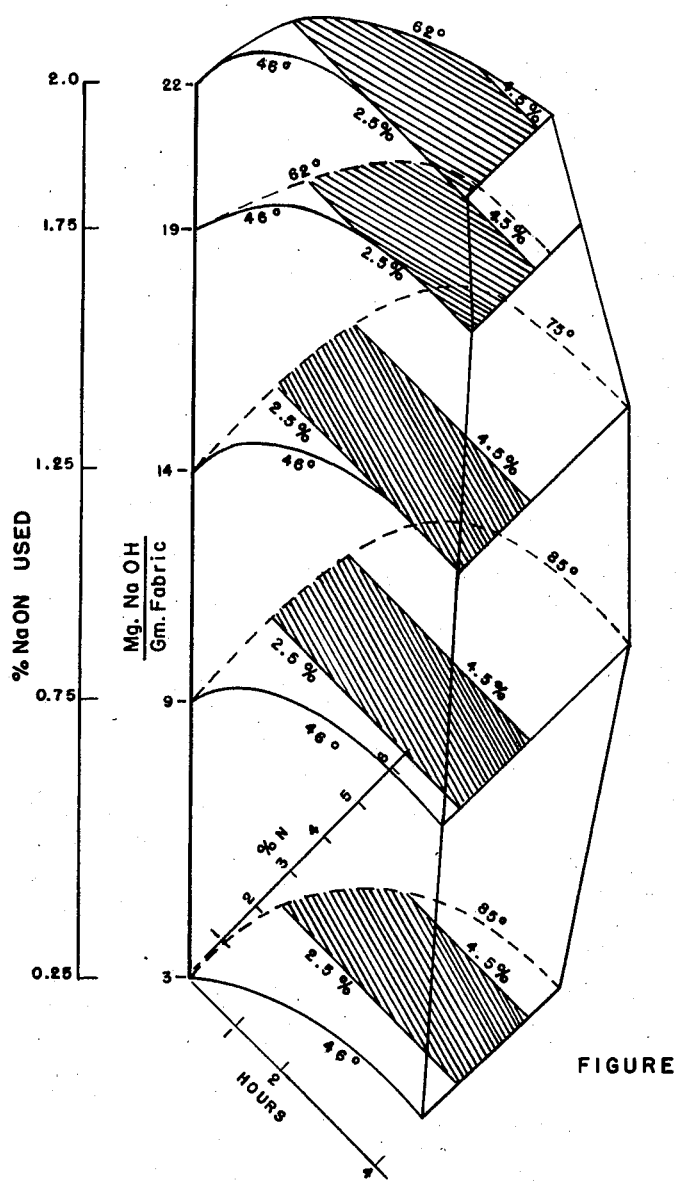

In the accompanying drawings:

Figs. 1 to 8 are two-dimensional graphs illustrating various reaction conditions, proportions of reactants, determinations and results in carrying out the invention;

Fig. 9 is a three-dimensional diagram illustrating graphically the conditions and amounts of materials used in carrying out a process of our invention; and Fig. 10 is a three-dimensional diagram in which the shaded areas illustrate graphically the conditions and amounts of materials used in carrying out a process of our invention for the production of mildew resistant cotton products of our invention.

In Table I, the ratio of actual sodium hydroxide to expected sodium hydroxide in the fabric decreases from a maximum value of 2.1 with 0.11% sodium hydroxide solution to a value of 1.2 with an 11% sodium hydroxide solution. Within the sodium hydroxide presteep concentration range of 0.25% to 3.0%, the ratio remains substantially constant at about 1.75. From an economic point of view the lower presteep concentrations are important since the sodium hydroxide is evidently substantively fixed, thereby permitting a more complete exhaustion of the sodium hydroxide solution and a more uniform concentration throughout the fiber structure.

In Fig. 1 the relation which exists between the actual sodium hydroxide in the fabric to that of the expected amount of sodium hydroxide in the fabric for a given sodium hydroxide concentration is shown. The dotted line in this graph is the relationship that would be expected to exist if no preferential sorption of sodium hydroxide occurred in the cotton fabric. The solid line shows the relationship that was actually found to exist between these two factors, as determined by experiment. These curves help to demonstrate the relationship pointed out in Table I.

Figure 2:
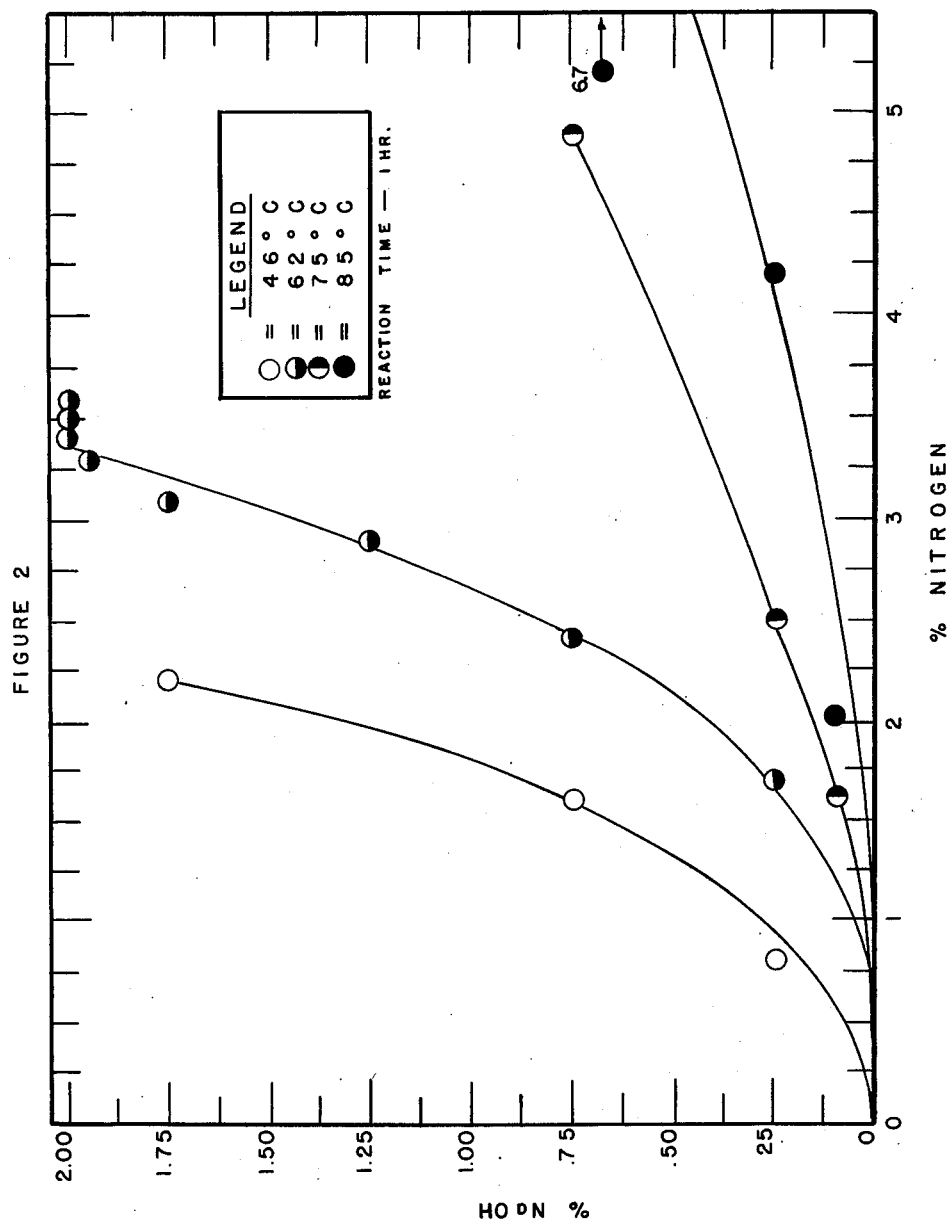
Figure 3:
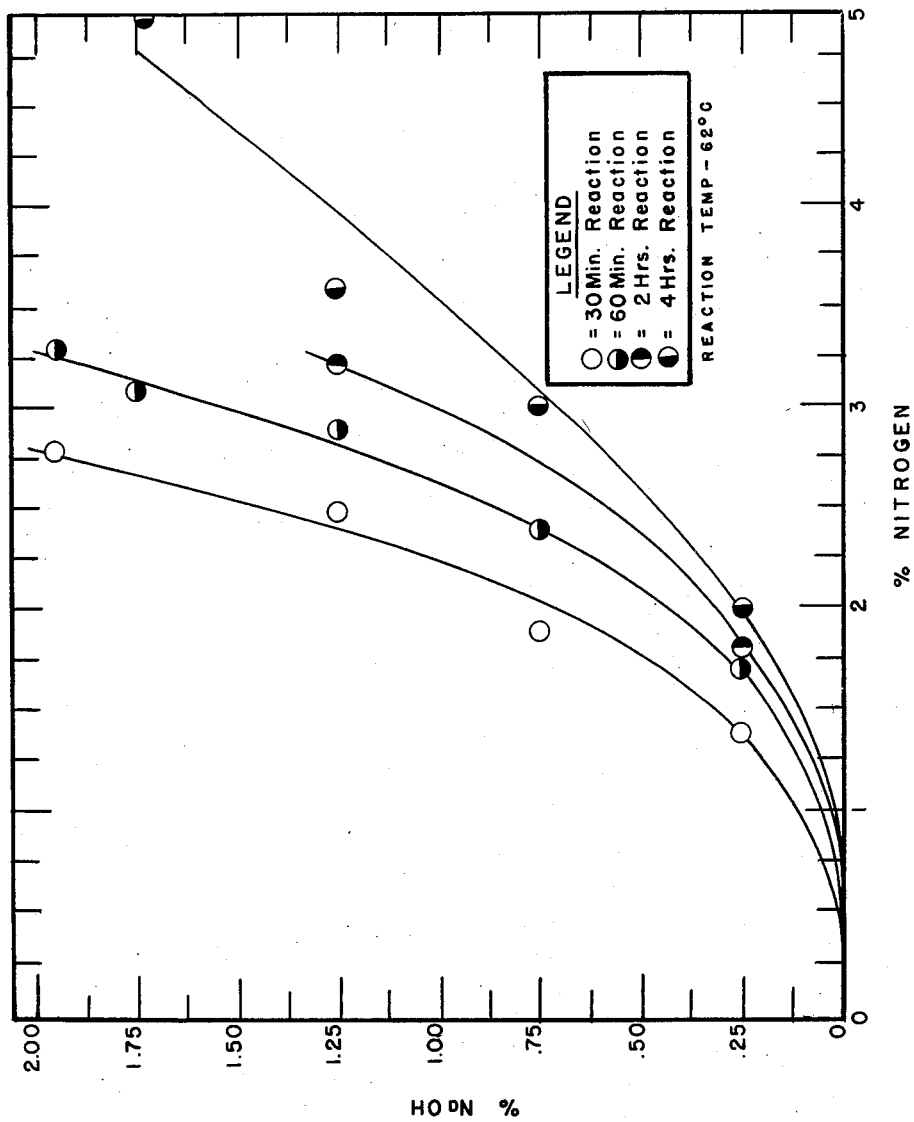
Figure 4:
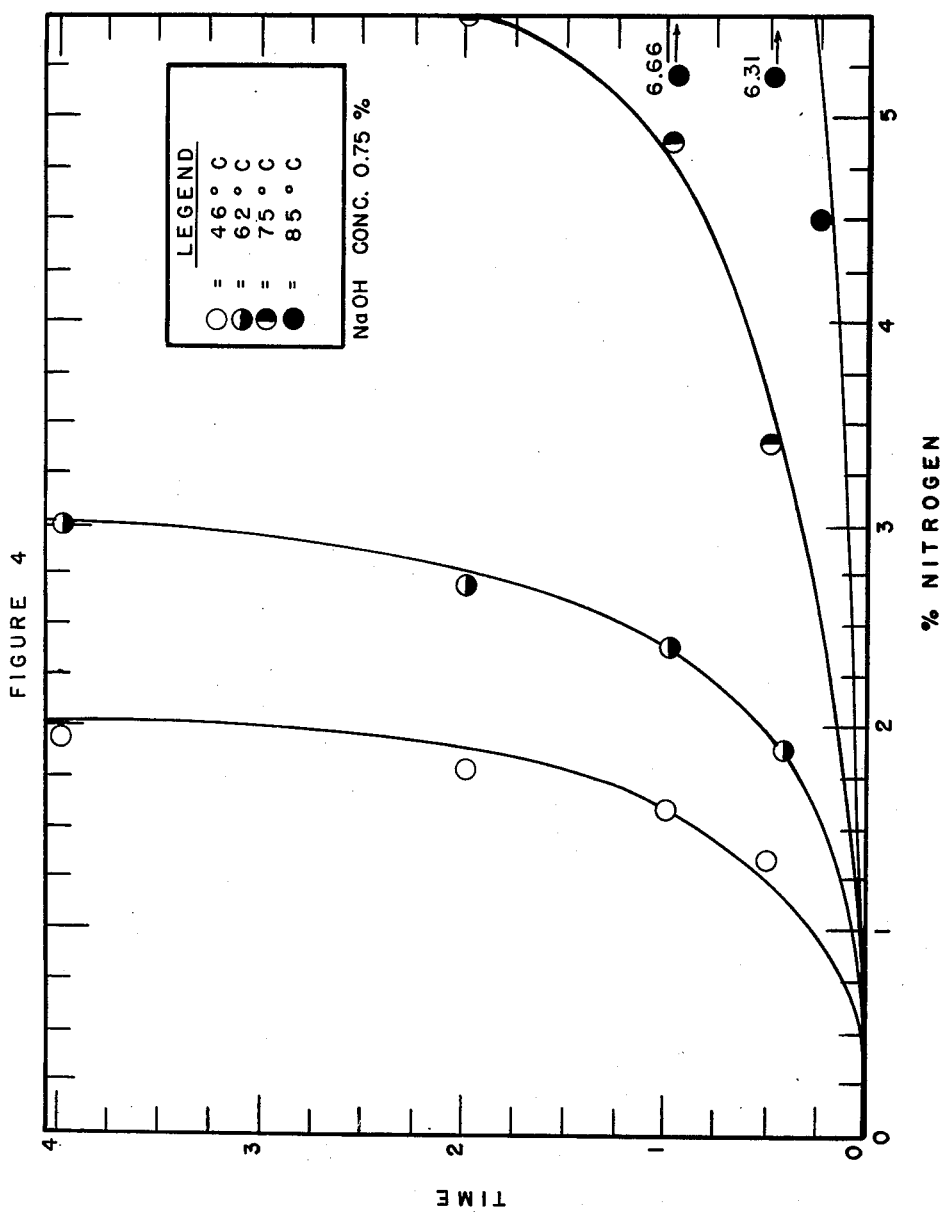
Figure 5:
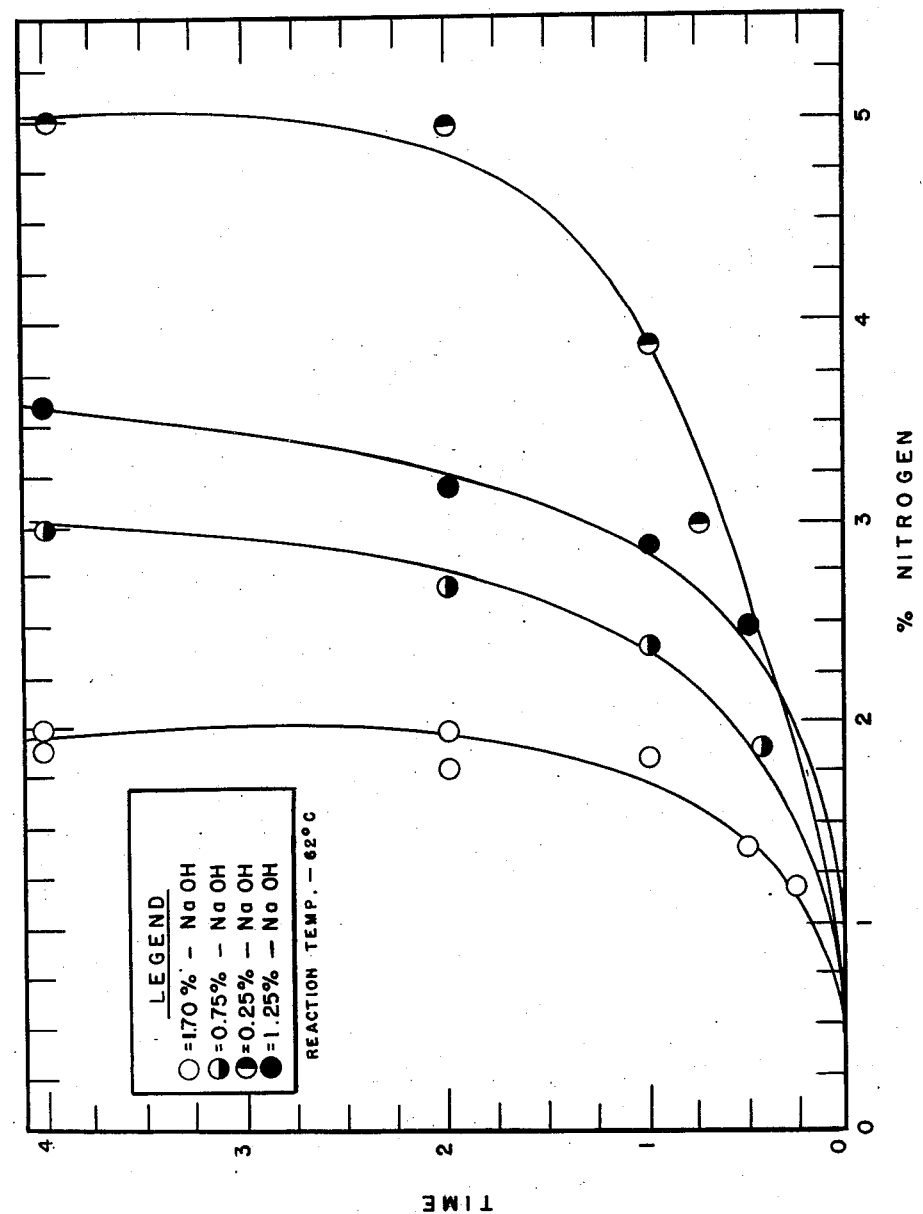
Figure 6:
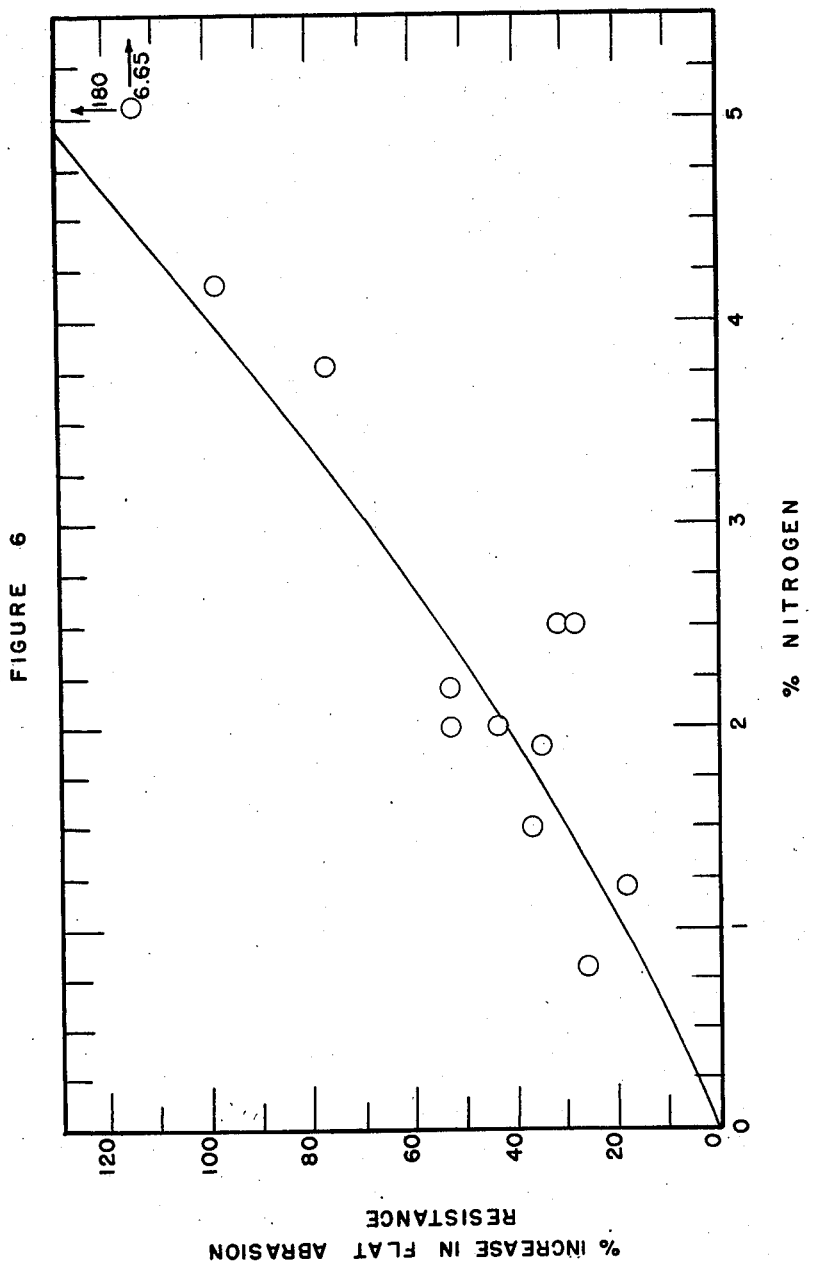
Figure 7:
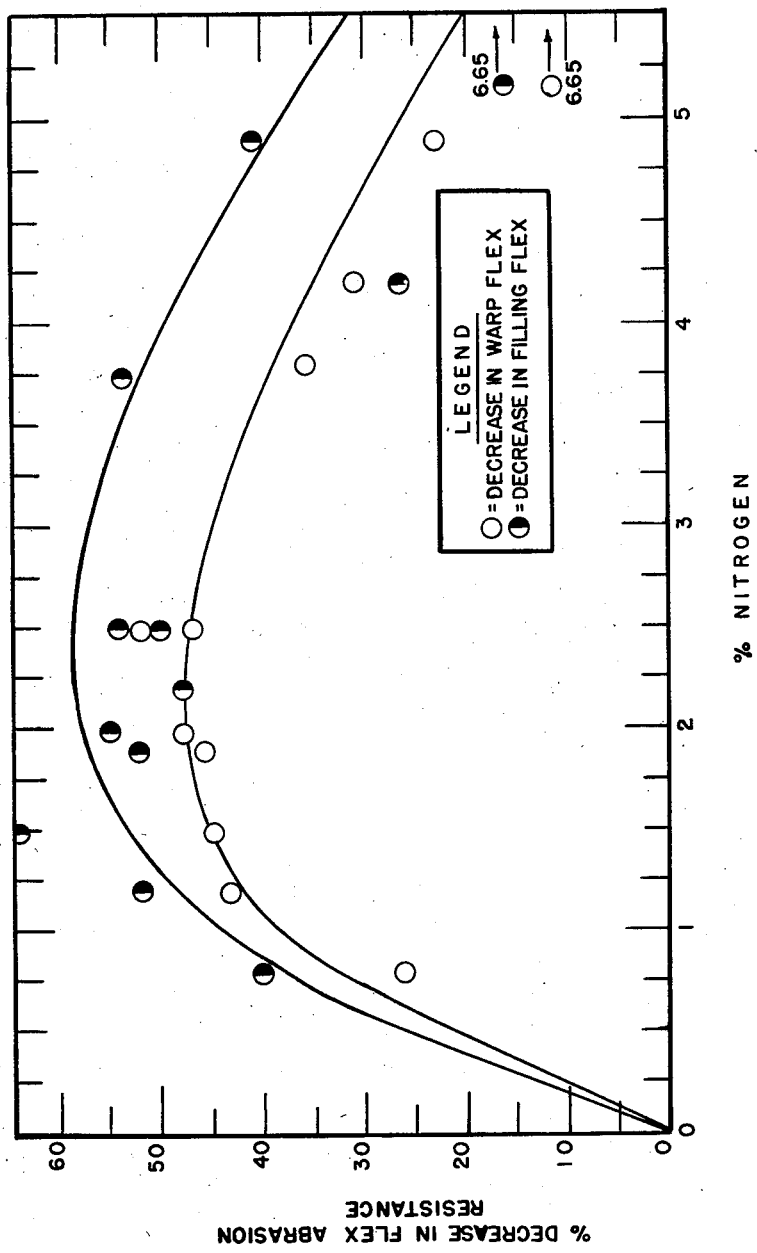

In Table II it will be noted that as the sodium hydroxide concentration increases the amount of nitrogen fixed to the cellulose increases at the temperature of 46° C. These relationships are also shown in Figs. 2 and 4. The ratio of acrylonitrile converted to acrylonitrile byproducts to acrylonitrile fixed to the cellulose is also shown in Table II so that one can determine the number of pounds of acrylonitrile lost in the reaction for each pound fixed to the cellulose. In general, it appears that as the time of reaction increases, the amount of recoverable acrylonitrile decreases. This is shown by the ratio of acrylonitrile used to acrylonitrile fixed, increasing as the time of reaction increases from one hour to four hours at the sodium hydroxide presteep concentration of 1.25% and also at a sodium hydroxide presteep concentration of 1.75%. The relationships indicated in Table II, as previously mentioned, are further verified by the data acquired upon treating cotton fabric with acrylonitrile at 62° C., Table III and Figs. 2, 3 and 4. It should be pointed out that the increase of the ratio of acrylonitrile used to acrylonitrile fixed in this instance shows in a more precise manner the progressive increase as the time of reaction increases. Upon increasing the reaction temperature to 75°, 80°, and 85° C. the relationships established in the previous tables are confirmed, Table IV, and Figs. 2 and 4.

Concerning the relationship between the nitrogen content of the cyanoethylated cotton fabric and various physical properties, the following appear to be pertinent conclusions:

Cyanoethylated cotton fabrics having nitrogen contents in the range of 2.5 to 4.5%, or greater, are immune to attack by microorganisms such as fungi and bacteria, Table V.

It will be noted that as the nitrogen content of the cyanoethylated fabric increases, the percentage loss in strength during soil burial decreases. This relationship seems to hold regardless of the reaction conditions required to obtain a given nitrogen content when dilute sodium hydroxide is employed in the presteep. It has been found, however, that the minimum nitrogen content for immunity to attack varies with the construction and weight of the fabric. The reaction conditions in our process which make use of 0.25% to 2% sodium hydroxide solution as the presteep and reaction conditions with acrylonitrile such as will give a nitrogen content of 2.5 to 4.5% or greater yield a satisfactory product, Fig. 10. Some data obtained indicates that for a given nitrogen content the fabric presteeped with a sodium hydroxide solution of a concentration less than 1% has the greatest resistance to microorganism attack. For example, when cotton fabric was treated with solutions of 0.25%, 2.0% and 10% sodium hydroxide and cyanoethylated to fix 2.5% of nitrogen, and the samples given identical soil burial tests at 28° C. for two weeks the loss in tensile strength for the three samples was 7%, 10% and 16%, respectively.

Cyanoethylated cotton fabric with nitrogen contents greater than 3% give satisfactory abrasion resistance as determined on the Stoll Abrader, Table V. In the case of the flat abrasion test, abrasion resistance progressively increases with increasing nitrogen content, Fig. 6. On the other hand, flex abrasion resistance progressively decreases until a nitrogen content of 2.5 to 3.0% is reached, Fig. 7, after which the decrease becomes progressively smaller. At about 4.5% to 6.0% nitrogen the flex abrasion resistance of the cyanoethylated fabric is only about 10% to 20% less than that of the untreated cotton fabric.

Figure 8:
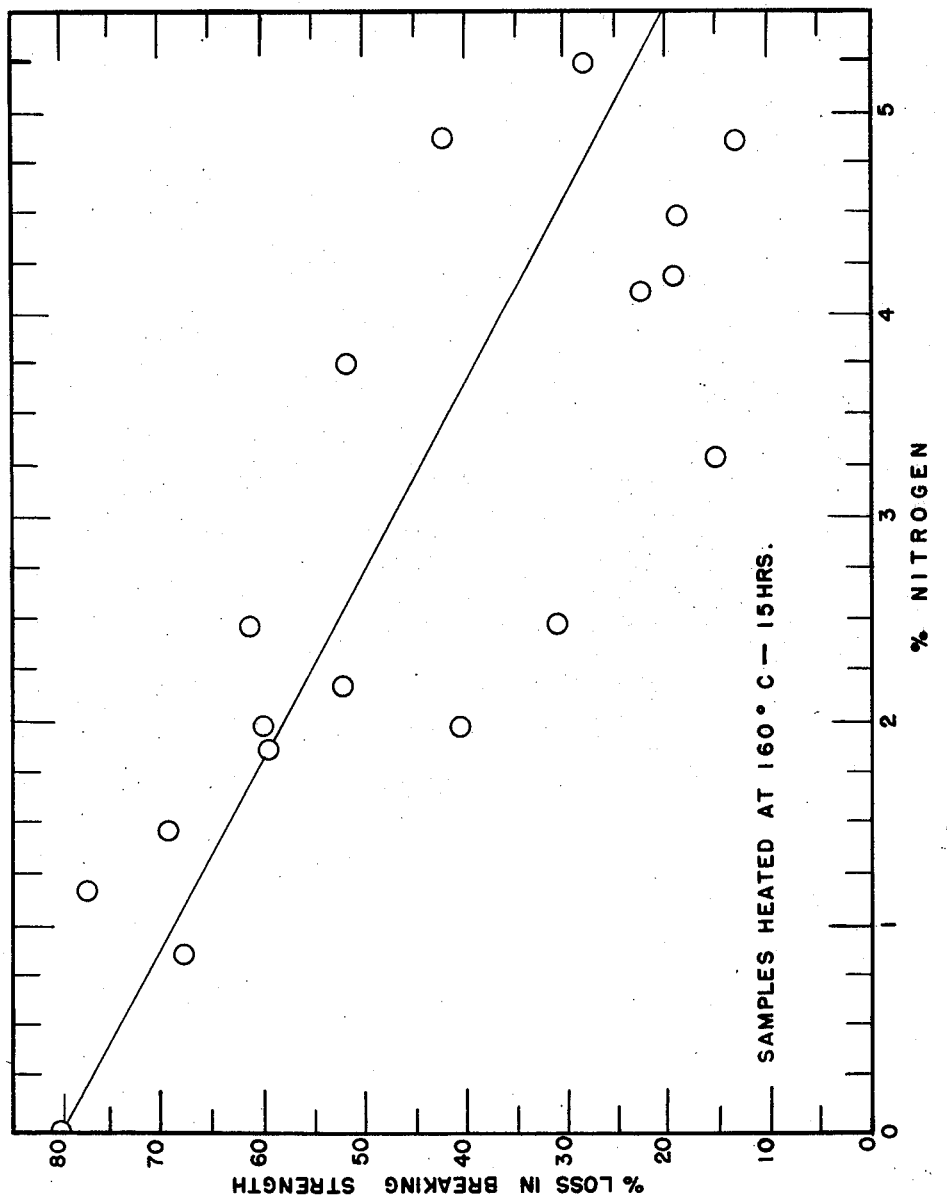

The resistance of cyanoethylated cotton fabric to degradation by heat progressively increases with increasing nitrogen content, Table V, Fig. 8. At equal nitrogen contents, cyanoethylated cotton fabric presteeped with sodium hydroxide solutions of less than 1% concentration and cyanoethylated at high reaction temperatures have the greatest resistance to degradation by heat. By way of example, cotton fabric presteeped with 0.1% sodium hydroxide and cyanoethylated to a nitrogen content of 2.0% gave a strength loss of 31% after heating for 15 hours at 160° C. When cotton fabric which was presteeped in a sodium hydroxide solution of 1.25% and cyanoethylated to a nitrogen content of 2.0% it lost 60% in strength in a similar test.

Cyanoethylated cotton fabrics with nitrogen contents in the range of 2.0 to 2.5% have the greatest affinity for many direct and vat dyes, Table VI. The affinity for acid and acetate dyes increases with increasing nitrogen contents. The dye affinity of cyanoethylated cotton fabric thus depends upon the class of dye and perhaps on other dye characteristics which have not been identified. For many dyes, the rate of dyeing is increased, the extent of dye bath exhaustion is increased and the color yield is increased (by this is meant, a darker shade is obtained with the cyanoethylated cotton for the same dye pickup than with untreated cotton).

From published work on cyanoethylated cotton, it would be anticipated that the affinity of cyanoethylated cotton for acetate dyes would increase with increasing nitrogen content. Likewise, it would be expected that the affinity for acid dyes would improve as the nitrogen content increased. On the other hand, it would not be anticipated that the affinity of cyanoethylated cotton for direct, vat, naphthol and developed dyes would be increased as the nitrogen content increased.

The most economical, and hence practical, conditions for cyanoethylation of cotton include: (a) presteep with low sodium hydroxide concentration in aqueous solution, (b) comparatively high temperatures, and (c) the shortest time permissible for treatment with acrylonitrile to obtain a given nitrogen content, Tables II, III and IV. Since the rate of cyanoethylation decreases with the time of reaction while the by-product formation increases, long reaction times are not economical. In general, a thirty minute reaction time is preferable, and periods of time longer than sixty minutes appear to be impractical.

The products suffering the least loss as a result of heat and mildew degradation are obtained by treating the cotton with sodium hydroxide solution of 1% or less in concentration. With reference to Table V and Fig. 8, it will be noted that the samples losing the least strength were presteeped in very dilute sodium hydroxide; that is, less than 1% concentration. Cotton presteeped in a 0.25% solution and cyanoethylated to a 2.5% nitrogen had a 7% loss in strength, while cotton presteeped in 10% solution and cyanoethylated to the same nitrogen content lost 16% in strength; both samples were subjected to the same microorganism attack.

Fig. 9 is a three-dimensional graph showing the relationship between the sodium hydroxide retained by the cotton fabric, $$\frac{\text{mg. NaOH}}{\text{gm. cotton}}$$

from the presteep solution, the reaction treatment time in hours with acrylonitrile, and the percent nitrogen fixed to the cotton at various reaction temperatures.

Fig. 9 is also a summarization of the data listed in Figs. 2–5 and in Tables II, III and IV. This graph is a means of determining the combination of reaction variables necessary to achieve a desired extent of reaction. It serves to delineate the conditions necessary to effect the extent of cyanoethylation required while maintaining the physical structure of the cotton fibers, and carrying out the reaction in the most economical manner.

Fig. 10 is a three-dimensional graph similar to that of Fig. 9 on a more restricted basis. In certain instances it is possible to define areas within the graph of Fig. 9 which yield a cyanoethylated product having the desired properties for a particular end use. The shaded areas in Fig. 10, for example, show the most desirable combinations of reaction variables to impart resistance to microbiological degradation.

Figs. 9 and 10 show that the extent and rate of reaction of the presteeped cotton fabric with acrylonitrile, at a given sodium hydroxide pickup, increase with temperature. This is an effect that would not have anticipated. In cellulose chemistry the extent of swelling of cotton with sodium hydroxide increases with sodium hydroxide concentration and also increases as the temperature is lowered. The conversion of crystalline cellulose to amorphous cellulose follows the swelling behaviour pattern. The extent of cyanoethylation should thus increase when the sodium hydroxide presteep conditions favoring the conversion of crystalline to amorphous cellulose are used. In the present instance the reverse of this is found; that is, increasing the temperature, which would be expected to decrease the extent of swelling, causes an increase in the rate and extent of reaction with acrylonitrile. Thus, at temperatures below 46° C., it is impossible to get a nitrogen content above about 2.2%, which is insufficient for good mildew and heat resistance, Table V and Fig. 10. By raising the temperature the nitrogen content leveling off point of the reaction is increased. This dependence on temperature to achieve the desired products is an important and surprising feature of the invention.

This application is a continuation-in-part of our copending application Serial No. 435,234, filed June 8, 1954, which was filed as a continuation-in-part of our application Serial No. 201,063, filed December 15, 1950, each of which has been abandoned.

We claim:

1. An improved fibrous cyanoethylated native cotton in which the amorphous portion of the native cotton fibers is chemically reacted with acrylonitrile to form cyanoethylcellulose, the nitrogen content of the cyanoethylated cotton varying from 0.50% to 6.5% based on the dry weight of the cyanoethylated cotton in which substantially all of the original crystalline structure of the native cotton fibers is retained, said cyanoethylated cotton having the appearance and hand of the native cotton fibers, and increased abrasion resistance, increased tensile strength, decreased moisture absorptivity, and increased affinity for acetate, vat, and sulfur dyes compared with native cotton fibers.

2. An improved fibrous cotton product according to claim 1 having a nitrogen content of from 2.5% to 4.5% and being highly resistant to fungi and bacteria that cause degradation.

3. The process of treating native cotton fibers to effect but a partial cyanoethylation of the cellulose and retain the natural physical structure of the fibers and produce a product having exceptional resistance to micro-organism degradation, which comprises presteeping the native cellulose fibers in an aqueous solution containing from 0.10% to 1.75% of sodium hydroxide until from 1.5 to 22 milligrams of sodium hydroxide per gram of the cotton is sorbed on the cotton, removing from the cotton substantially all of the adhering liquid solution, and reacting the presteeped cotton while containing said amount of sorbed sodium hydroxide with liquid acrylonitrile at a temperature of from 46° to 85° C. for a period not to exceed 60 minutes until the amorphous portion of the cotton fibers form cyanoethylcellulose in such an amount that the nitrogen content varies from 2.5% to 6.5%, the crystalline structure of the cotton substantially unaltered.

4. The process of treating native cotton fibers to effect but a partial cyanoethylation of the cellulose and retain the natural physical structure of the fibers which comprises treating native cotton fibers with an aqueous solution of sodium hydroxide containing from 0.10% to 10% of sodium hydroxide for a period of time sufficient to sorb on the cotton from 1.5 to 22 milligrams of sodium hydroxide per gram of cotton, removing from the cotton substantially all of the adhering liquid solution, and reacting the cotton while containing said sorbed amount of sodium hydroxide with liquid acrylonitrile at a temperature of from 46° C. to 85° C., and for a period sufficient to effect such an amount of cyanoethylation that the cotton contains from 0.50% to 6.5% of nitrogen based on the weight of the cyanoethylated cotton, until the acrylonitrile reacts with the amorphous portion of the cotton, the crystalline structure of the cotton being retained substantially unaltered, and said cotton having substantially the appearance and hand of natural cotton.

5. In the process of claim 4, treating the cotton with the caustic solution for a period not to exceed about 15 minutes and centrifuging the cotton to remove substantially all the unabsorbed solution.

6. In the process of claim 4, treating the cotton with a sodium hydroxide solution containing from 0.10% to 1.75% of sodium hydroxide.

References Cited in the file of this patent
UNITED STATES PATENTS

| | | |
|---|---|---|
| 2,375,847 | Houtz | May 15, 1945 |
| 2,390,032 | Stallings | Nov. 27, 1945 |
| 2,473,308 | Stallings | June 14, 1949 |
| 2,482,011 | MacGregor | Sept. 13, 1949 |
| 2,499,501 | Hollihan | Mar. 7, 1950 |